(12) United States Patent
Wang et al.

(10) Patent No.: US 11,461,229 B2
(45) Date of Patent: Oct. 4, 2022

(54) EFFICIENT GARBAGE COLLECTION OF VARIABLE SIZE CHUNKING DEDUPLICATION

(71) Applicant: VMware, Inc., Palo Alto, CA (US)

(72) Inventors: Wenguang Wang, Santa Clara, CA (US); Junlong Gao, Mountain View, CA (US); Marcos K. Aguilera, Palo Alto, CA (US); Richard P. Spillane, Mountain View, CA (US); Christos Karamanolis, Los Gatos, CA (US); Maxime Austruy, Lausanne (CH)

(73) Assignee: VMWARE, INC., Palo Alto, CA (US)

( * ) Notice: Subject to any disclaimer, the term of this patent is extended or adjusted under 35 U.S.C. 154(b) by 597 days.

(21) Appl. No.: 16/552,954

(22) Filed: Aug. 27, 2019

(65) Prior Publication Data
US 2021/0064522 A1 Mar. 4, 2021

(51) Int. Cl.
*G06F 3/06* (2006.01)
*G06F 12/02* (2006.01)

(52) U.S. Cl.
CPC ........ *G06F 12/0253* (2013.01); *G06F 3/0608* (2013.01); *G06F 3/0641* (2013.01); *G06F 3/0652* (2013.01); *G06F 3/0673* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 5,990,810 A | 11/1999 | Williams | |
| 6,154,147 A | 11/2000 | Gabrielle et al. | |
| 7,925,615 B1 | 4/2011 | Sutton, Jr. et al. | |
| 8,140,821 B1 | 3/2012 | Raizen et al. | |
| 8,370,297 B2 | 2/2013 | Anglin et al. | |
| 8,539,148 B1 | 9/2013 | Chen et al. | |

(Continued)

FOREIGN PATENT DOCUMENTS

| | | | | |
|---|---|---|---|---|
| AU | 2013206404 A1 | * | 7/2013 | .......... G06F 11/1451 |
| WO | WO-2010036754 A1 | * | 4/2010 | .......... G06F 11/1451 |

OTHER PUBLICATIONS

David Geer, "Reducing the Storage Burden via Data Deduplication", Industry Trends, Dec. 2008, pp. 15-17 (Year: 2008).*

(Continued)

*Primary Examiner* — Christopher D Birkhimer
(74) *Attorney, Agent, or Firm* — Patterson & Sheridan, LLP

(57) ABSTRACT

The present disclosure provides techniques for deallocating previously allocated storage blocks. The techniques include obtaining a list of chunk IDs to analyze, choosing a chunk ID, and determining the storage blocks spanned by the chunk corresponding to the chosen chunk ID. The technique further includes determining whether any file references any storage blocks spanned by the chunk. The determining may be performed by comparing an internal reference count to a total reference count, where the internal reference count is the number of reference to the storage block by a chunk ID data structure. If no files reference any of the storage blocks spanned by the chunk, then all the storage blocks of the chunk can be deallocated.

20 Claims, 9 Drawing Sheets

(56) References Cited

U.S. PATENT DOCUMENTS

| | | | | |
|---|---|---|---|---|
| 8,732,403 | B1* | 5/2014 | Nayak | G06F 3/0619 |
| | | | | 711/170 |
| 9,298,723 | B1 | 3/2016 | Vincent | |
| 9,372,879 | B1 | 6/2016 | Evenson | |
| 9,424,285 | B1 | 8/2016 | Condict et al. | |
| 9,430,331 | B1 | 8/2016 | Basov et al. | |
| 9,633,033 | B2* | 4/2017 | Vijayan | G06F 16/1748 |
| 9,715,434 | B1* | 7/2017 | Xu | G06F 3/067 |
| 9,824,095 | B1* | 11/2017 | Taylor | G06F 16/11 |
| 9,946,724 | B1 | 4/2018 | Ghosh et al. | |
| 10,037,337 | B1 | 7/2018 | Shanmuganathan | |
| 10,075,291 | B1 | 9/2018 | Molaro et al. | |
| 10,108,543 | B1* | 10/2018 | Duggal | G06F 11/1453 |
| 10,108,544 | B1* | 10/2018 | Duggal | G06F 11/14 |
| 10,108,634 | B1 | 10/2018 | Pal | |
| 10,496,611 | B1 | 12/2019 | Singh | |
| 10,762,051 | B1 | 9/2020 | Bhagavandas et al. | |
| 10,795,812 | B1* | 10/2020 | Duggal | G06F 3/067 |
| 11,323,513 | B1* | 5/2022 | Vibhor | G06N 7/005 |
| 2002/0154010 | A1 | 10/2002 | Tu et al. | |
| 2005/0060643 | A1 | 3/2005 | Glass et al. | |
| 2006/0089936 | A1 | 4/2006 | Chalker | |
| 2007/0038658 | A1 | 2/2007 | Ghosh | |
| 2007/0116025 | A1 | 5/2007 | Yadlon et al. | |
| 2008/0144079 | A1* | 6/2008 | Pandey | H03M 7/30 |
| | | | | 358/1.15 |
| 2009/0049260 | A1 | 2/2009 | Upadhyayula | |
| 2009/0307251 | A1 | 12/2009 | Heller et al. | |
| 2010/0077013 | A1* | 3/2010 | Clements | G06F 16/1748 |
| | | | | 707/822 |
| 2010/0082672 | A1* | 4/2010 | Kottomtharayil | G06F 11/1451 |
| | | | | 711/E12.001 |
| 2010/0088296 | A1* | 4/2010 | Periyagaram | G06F 16/183 |
| | | | | 707/E17.014 |
| 2010/0174881 | A1* | 7/2010 | Anglin | G06F 11/1453 |
| | | | | 711/E12.103 |
| 2010/0223441 | A1 | 9/2010 | Lillibridge et al. | |
| 2010/0281081 | A1* | 11/2010 | Stager | G06F 9/5022 |
| | | | | 707/814 |
| 2010/0299490 | A1* | 11/2010 | Attarde | G06F 11/1453 |
| | | | | 711/170 |
| 2010/0333116 | A1* | 12/2010 | Prahlad | G06Q 30/0206 |
| | | | | 713/153 |
| 2011/0078458 | A1 | 3/2011 | Furukawa et al. | |
| 2011/0122255 | A1 | 5/2011 | Haritaoglu | |
| 2011/0185149 | A1 | 7/2011 | Gruhl et al. | |
| 2011/0246741 | A1 | 10/2011 | Raymond et al. | |
| 2011/0276744 | A1 | 11/2011 | Sengupta et al. | |
| 2012/0150823 | A1 | 6/2012 | Tofano | |
| 2012/0158709 | A1 | 6/2012 | Gaonkar et al. | |
| 2012/0191675 | A1 | 7/2012 | Kim et al. | |
| 2012/0311339 | A1 | 12/2012 | Irvine | |
| 2013/0018851 | A1 | 1/2013 | Jayaraman et al. | |
| 2013/0060739 | A1 | 3/2013 | Kalach et al. | |
| 2013/0339317 | A1 | 12/2013 | Kim et al. | |
| 2014/0188822 | A1 | 7/2014 | Das | |
| 2014/0229440 | A1 | 8/2014 | Venkatesh et al. | |
| 2014/0229696 | A1 | 8/2014 | Feng et al. | |
| 2014/0344195 | A1 | 11/2014 | Drew et al. | |
| 2015/0205816 | A1* | 7/2015 | Periyagaram | G06F 3/067 |
| | | | | 707/827 |
| 2015/0261776 | A1* | 9/2015 | Attarde | G06F 16/1748 |
| | | | | 707/664 |
| 2015/0261792 | A1* | 9/2015 | Attarde | G06F 16/215 |
| | | | | 707/616 |
| 2015/0379430 | A1 | 12/2015 | Dirac et al. | |
| 2016/0078068 | A1* | 3/2016 | Agrawal | G06F 16/2365 |
| | | | | 707/692 |
| 2016/0171009 | A1 | 6/2016 | Fang et al. | |
| 2016/0299818 | A1* | 10/2016 | Vijayan | G06F 16/113 |
| 2016/0306560 | A1* | 10/2016 | Maranna | G06F 3/0619 |
| 2016/0342338 | A1* | 11/2016 | Wang | G06F 3/0656 |
| 2016/0350324 | A1* | 12/2016 | Wang | G06F 16/137 |
| 2017/0061138 | A1 | 3/2017 | Lambert | |
| 2017/0131934 | A1 | 5/2017 | Kaczmarczyk et al. | |
| 2017/0160950 | A1 | 6/2017 | Sazawa et al. | |
| 2017/0270135 | A1 | 9/2017 | Lambright | |
| 2017/0300550 | A1 | 10/2017 | Emberson et al. | |
| 2018/0150562 | A1 | 5/2018 | Gundimeda et al. | |
| 2018/0173732 | A1 | 6/2018 | Wu et al. | |
| 2018/0314727 | A1* | 11/2018 | Epstein | G06N 5/003 |
| 2020/0133547 | A1 | 4/2020 | Armangau et al. | |
| 2020/0134049 | A1 | 4/2020 | Bassov et al. | |
| 2020/0249860 | A1 | 8/2020 | Faibish et al. | |
| 2020/0310686 | A1* | 10/2020 | Truong | G06F 3/067 |
| 2021/0034578 | A1 | 2/2021 | Dalmatov et al. | |
| 2021/0064579 | A1 | 3/2021 | Wang et al. | |
| 2021/0064580 | A1 | 3/2021 | Gao et al. | |
| 2021/0064581 | A1 | 3/2021 | Wang et al. | |
| 2021/0064582 | A1 | 3/2021 | Wang et al. | |
| 2021/0064589 | A1 | 3/2021 | Wang et al. | |

OTHER PUBLICATIONS

Bonwick, Jeff, ZFS Deduplication, https://blogs.oracle.com/bonwick/zfs-deduplication-v2, Nov. 2, 2009.

Colgrove, John et al., Purity: Building Fast, Highly-Available Enterprise Flash Storage from Commodity Components. In Proceedings of SIGMOD 2015: Industrial Track, May 2015.

Decandia, Giuseppe et al., Dynamo: Amazon's Highly Available Key-value Store. SIGOPS Oper. Syst. Rev., 41 (6):205-220, Oct. 2007.

El-Shimi, Ahmed et al., Primary Data Deduplication—Large Scale Study and System Design. In Presented as part of the 2012 USENIX Annual Technical Conference (USENIX ATC 12), pp. 285-296, Boston, MA, 2012. USENIX.

Gao, Junlong et al., BOSSFS: An Enterprise File Service as Fast as vSAN and as Cheap as S3. In Proceedings of VMware Radio 2018, May 2018.

Gueron, Shay et al., SHA-512/256. In Proceedings of the 2011 Eighth International Conference on Information Technology: New Generations, ITNG '11, pp. 354-358, Washington, DC, USA, 2011. IEEE Computer Society.

Gupta, Abhishek et al., A Highly Concurrent and IO-Parallel B-Tree. In Proceedings of VMware Radio 2018, May 2018.

Intel. Isa-I performance report release 2.19. https://01.org/sites/default/files/documentation/intel_isa-1_2.19_performance_report_0.pdf, Sep. 29, 2017.

Leung, Andrew W. et al., Measurement and Analysis of Large-Scale Network File System Workloads. In USENIX 2008 Annual Technical Conference, ATC'08, pp. 213-226, Berkeley, CA, USA, 2008 USENIX Association.

Lu, Luke et al., VDFS: A Cloud-Centric Virtual Distributed File System. In Proceedings of VMware Radio 2015, May 2015.

Muthitacharoen, Athicha et al., A Low-bandwidth Network File System. In Proceedings of the Eighteenth ACM Symposium on Operating Systems Principles, SOSP '01, p. 174-187, New York, NY, USA, 2001. ACM.

Introduction to VMware vSAN, VMware, Apr. 14, 2017. https://www.youtube.com/watch?v=g8S3UT_vvUo.

Patrizio, Andy, IDC: Expect 175 zettabytes of data worldwide by 2025. https://tinyurl.com/y9494x9o, Dec. 3, 2018.

Roselli, Drew et al., Characteristics of File System Workloads. Technical Report UCB/CSD-98-1029, EECS Department, University of California, Berkeley, 1998.

Roselli, Drew et al., A Comparison of File System Workloads. Proceedings of 2000 USENIX Annual Technical Conference, ATEC'00, pp. 1-15, San Diego, CA, USA, Jun. 18-23, 2000. USENIX Association.

Stoica, Ion et al., Chord: A Scalable Peer-to-Peer Lookup Service for Internet Applications. SIGCOMM Comput. Commun. Rev., 31(4):149-160, Aug. 2001.

Zaydman, Oleg et al., Teleportation of VM Disk Images over WAN, In Proceedings of VMware Radio 2018, May 2018.

Zhu, Benjamin et al., Avoiding the Disk Bottleneck in the Data Domain Deduplication File System. In Proceedings of the 6th

(56) References Cited

OTHER PUBLICATIONS

USENIX Conference on File and Storage Technologies, FAST'08, pp. 18:1-18:14, Berkeley, CA, USA, 2008. USENIX Association.
Sorting a HashMap according to keys in Java, www.geeksforgeeks.org, 2018, pp. 1-7.
Lexicographic Order, WolframMathWorld, https://mathworld.wolfram.com/LexicographicOrder.html, 2019, p. 1.

* cited by examiner

Portion of Reference Counts Table 268

170_B  Block No. → Reference Counts 156_B  (2, 5)

170_C  Block No. → Reference Counts 156_C  (1, 3)

170_D  Block No. → Reference Counts 156_D  (1, 3)

170_E  Block No. → Reference Counts 156_E  (1, 3)

EFFICIENT GARBAGE COLLECTION OF VARIABLE SIZE CHUNKING DEDUPLICATION

RELATED APPLICATIONS

This application is related to U.S. application Ser. No. 16/552,880, titled "SCALE OUT CHUNK STORE TO MULTIPLE NODES TO ALLOW CONCURRENT DEDUPLICATION," U.S. application Ser. No. 16/552,908, titled "A PROBABILISTIC ALGORITHM TO CHECK WHETHER A FILE IS UNIQUE FOR DEDUPLICATION," U.S. application Ser. No. 16/552,998, titled "ORGANIZE CHUNK STORE TO PRESERVE LOCALITY OF HASH VALUES AND REFERENCE COUNTS FOR DEDUPLICATION," U.S. application Ser. No. 16/552,965, titled "FAST ALGORITHM TO FIND FILE SYSTEM DIFFERENCE FOR DEDUPLICATION," and U.S. application Ser. No. 16/552,976, titled "SMALL IN-MEMORY CACHE TO SPEED UP CHUNK STORE OPERATION FOR DEDUPLICATION." Each of these applications is filed on the same day as the present application. The entire contents of each of these applications are hereby incorporated by reference herein.

BACKGROUND

The amount of data worldwide grows each year at a rate that is faster than the price drop of storage devices. Thus, the total cost of storing data continues to increase. As a result, it is increasingly important to develop and improve data efficiency techniques, such as deduplication and compression for file and storage systems. Data deduplication works by calculating a hash value for each data unit and then storing units with the same hash only once.

However, existing deduplication system usually compromise between space efficiency and speed of data retrieval, and are usually optimized for one or the other. For example, organizing chunk information by hash loses locality and reduces speed of data retrieval.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for deallocating previously allocated storage blocks. The techniques include obtaining a list of chunk IDs to analyze, choosing a chunk ID, and determining the storage blocks spanned by the chunk corresponding to the chosen chunk ID. The technique further includes determining whether any file references any storage blocks spanned by the chunk. The determining may be performed by comparing an internal reference count to a total reference count, where the internal reference count is the number of references to the storage block by a chunk ID data structure. If no files reference any of the storage blocks spanned by the chunk, then all the storage blocks of the chunk can be deallocated. An improvement in efficient use of storage space improves the way a computer stores and retrieves data both in memory and in storage. The techniques herein are directed to a specific implementation of a solution to a problem in the software arts.

The present also disclosure provides techniques for deduplicating files. The techniques include creating a data structure that organizes metadata about chunks of files, the organization of the metadata preserving order and locality of the chunks within files. A chunk of a file is a portion of a file, as described further below. Order and locality are further described below with reference to FIG. 1C and FIG. 2. The organization of the metadata within storage blocks of storage devices matches the order of chunks within files. Upon a read or write operation to a metadata, the preservation of locality of metadata results in the likely pre-fetching, from storage into a memory cache, metadata of subsequent and contiguous chunks. The preserved locality results in faster subsequent read and write operations of metadata, because the read and write operations are executed from memory rather than from storage.

The faster read and write operations result in an improvement in the functioning of the computer itself. The computer is able to execute basic read and write operations faster than otherwise. Additionally, an improvement in a deduplication process results in an improvement in the functioning of the computer itself. An improvement in deduplication improves the way a computer stores and retrieves data in memory and in storage. The deduplication techniques herein are directed to a specific implementation of a solution to a problem in the software arts.

Figure 1A:
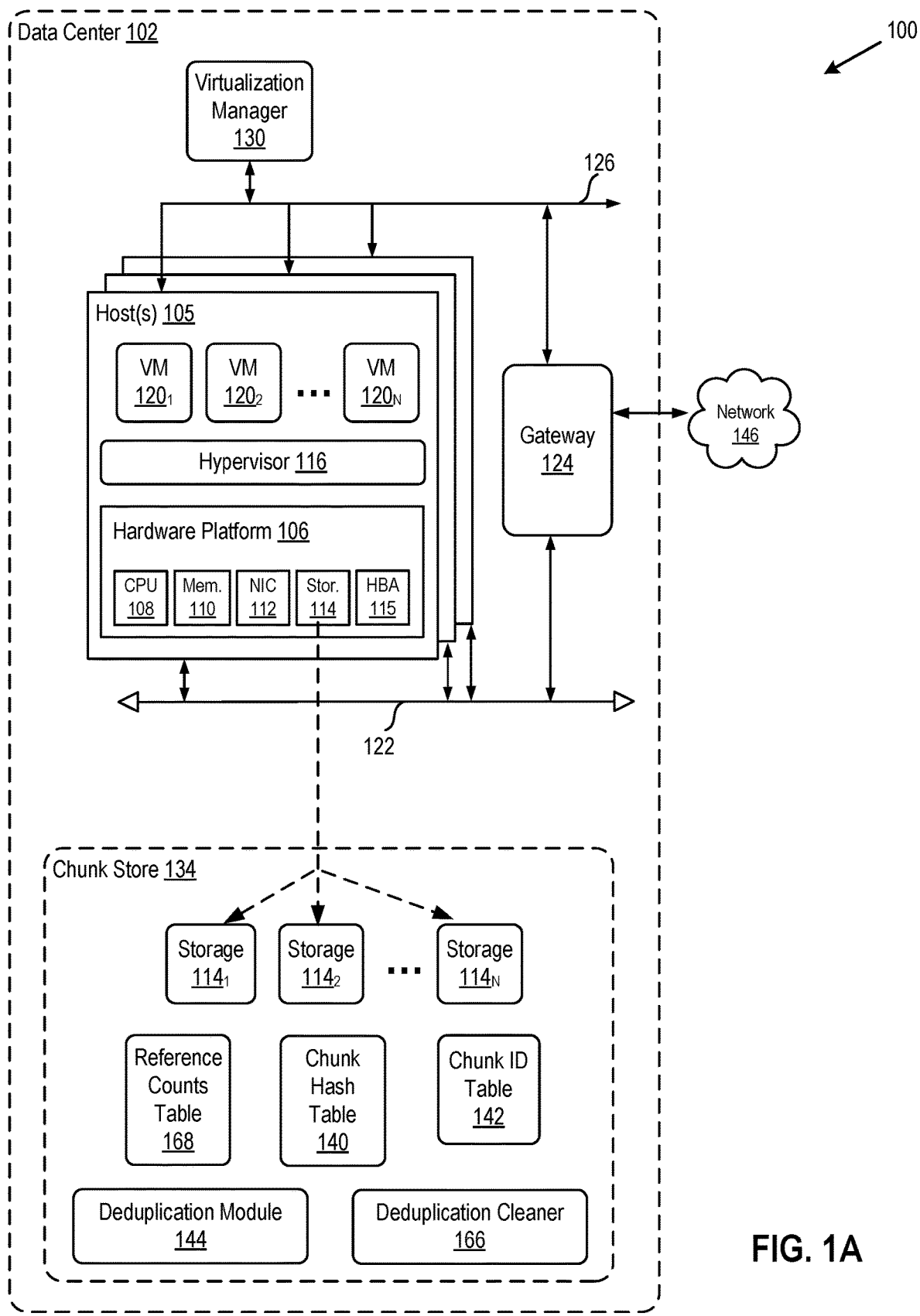
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes a data center 102 connected to a network 146. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, a data network 122, and a chunk store 134. Networks 122, 126, in one embodiment, each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack.

Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 enables host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Figure 1B:
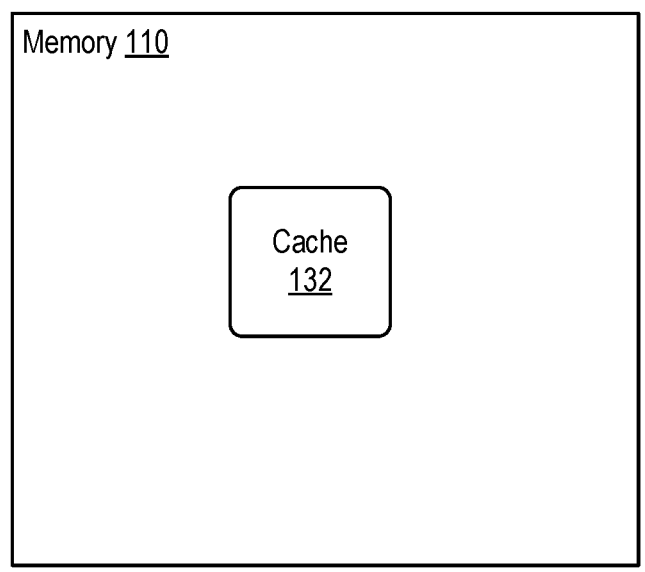
FIG. 1B depicts a block diagram of a cache within a memory of a host machine, according to an embodiment.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 also includes a cache 132 (see FIG. 1B). Although cache 132 is shown as located within memory 110, cache 132 may be implemented in other components of computer system 100, such as in an external storage or memory device, shared by a plurality of hosts 105, and coupled to host 105 via HBA 115 or NIC 112. Cache 132 comprises cached copies of storage blocks 204 (see FIG. 2B) of storage(s) 114. The cached storage blocks 204 in cache 132 are fetched into memory 110 during deduplication method 300 discussed below with reference to FIG. 3.

Host 105 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 provides hosts 105, VMs 120 and other components in data center 102 with connectivity to one or more networks used to communicate with one or more remote data centers. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Chunk store 134 comprises storages 114, tables 140, 142, 168, deduplication module 144, and deduplication cleaner 166. Chunk store 134 is a storage system that stores data of files 200 (see FIG. 2A). The data of files 200 within chunk store 134 is deduplicated by deduplication module 144.

Deduplication module 144 may be a background process working asynchronously relative to input/output (I/O) operations directed to chunk store 134, such as asynchronously relative to I/O operations by hosts 105 or VMs 120. Deduplication module 144 may be software running within hypervisor 116, memory 110, VM 120, storage 114, or within another component of system 100. Deduplication module 144 may be a separate physical device connected to chunk store 134. Host 105 or system 100 may comprise one or more deduplication modules 144. Deduplication module 144 may be associated with a virtual node running on host 105, as described in U.S. application Ser. No. 16/552,880, incorporated by reference above.

One method of deduplication that may be used by deduplication module 144 is described in U.S. application Ser. No. 12/356,921, titled "Computer Storage Deduplication," filed on Jan. 21, 2009, the entire content of which is hereby incorporated by reference herein. The method of deduplication that may be used by deduplication module 144 may be that described in application Ser. No. 12/356,921, as modified by techniques disclosed herein.

Chunk store 134 comprises one or more storage devices 114. Although the storage devices of chunk store 134 are shown as storage devices 114 of host 105, storage devices of chunk store 134 may be any storage devices such as other storages that may be connected to host 105 through HBA 115. In an embodiment, chunk store 134 may be a distributed storage system implemented as an aggregation of storage devices 114 accessible by a plurality of hosts 105. In such a distributed storage system, chunk store 134 may be a virtual storage area network (vSAN), and hypervisor 116 may comprise a vSAN module (not shown), as described in U.S. application Ser. No. 14/010,247, titled "Distributed Policy-Based Provisioning and Enforcement for Quality of Service," filed on Aug. 26, 2013, now U.S. Pat. No. 9,887,924, the entire content of which is hereby incorporated by reference herein.

Figure 2A:
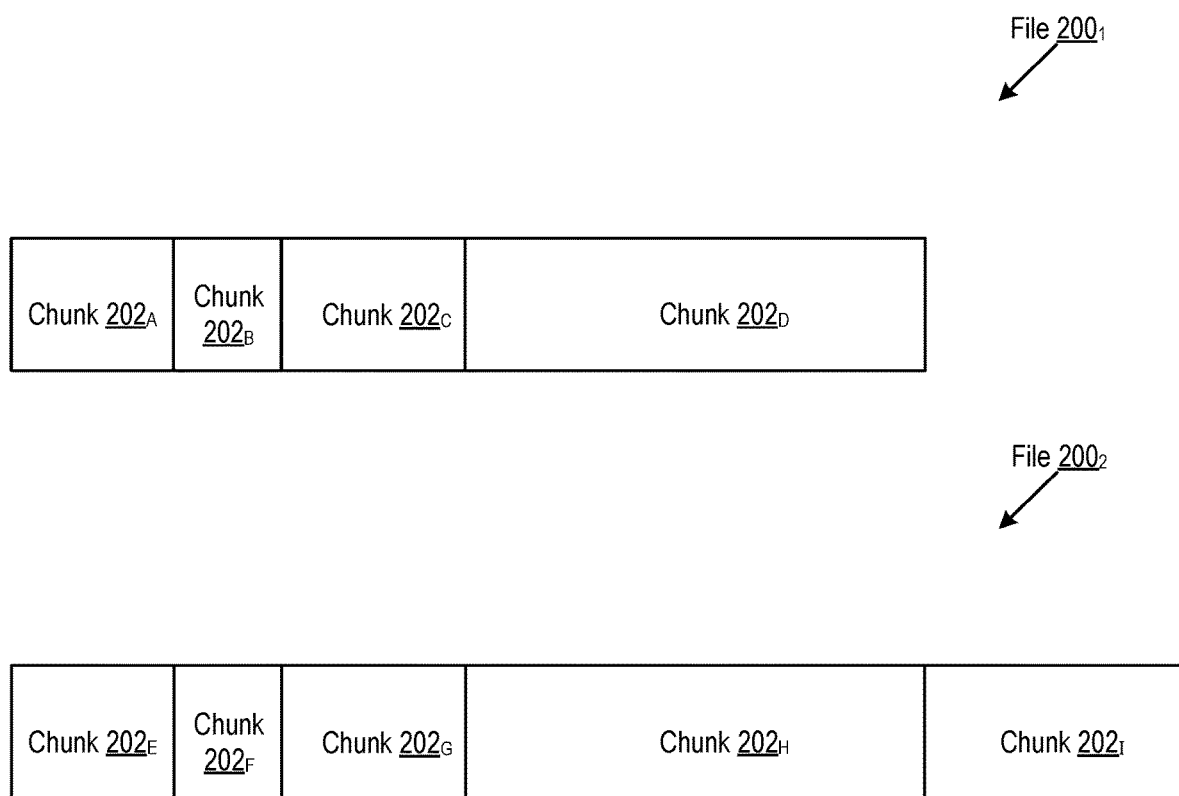
FIG. 2A depicts a block diagram of two exemplary files, according to an embodiment.

FIG. 2A depicts a block diagram of two exemplary files 200, according to an embodiment. Storage devices 114 of chunk store 134 store files 200. Each file 200 is divided into portions or chunks 202. In an embodiment, deduplication performed herein is byte-level deduplication. With byte-level deduplication, file 200 may be divided into chunks 202 by the following exemplary process. Deduplication module 144 chooses a small window size and computes a hash for a byte window starting at every byte offset of file 200. This can be done efficiently using Rabin fingerprints. If the hash matches a fixed value (e.g., zero), deduplication module 144 considers that file offset to be a boundary. Such a boundary is called a content-based boundary. A chunk 202 may be defined to be the file data between two boundaries. A boundary may also be the start and end of file 200. In an embodiment, when separating a file 200 into chunks 202, a constraint may be placed on the algorithm that defines the chunks 202 so as to make sure that each chunk 202 is at least the size of one storage block 204 (see FIG. 2B) of a storage (e.g., storage 114).

Deduplication module 144 then computes a second hash for each chunk 202, and this is the hash that is checked against and inserted into chunk store data structures 140 and 142, as further described below. The second hash may be computed by, for example, a hash algorithm such as secure hash algorithm (SHA)-256 or SHA-512. In an embodiment, the computed hash may be truncated, and the truncated hash is the second hash that is associated with a chunk 202, as further described with reference to FIG. 3, below.

A benefit of such a method of dividing a file 200 into chunks 202 is that, if data in file 200 shifted (e.g., a new line is inserted at the beginning of file 200), most chunks 202 in file 200 are not affected. Such boundary setting may result in the detection of more duplicated content and may achieve increased storage space saving via deduplication. The average size of chunk 202 may be, for example, approximately 80 KB. Chunks 202 may be of different sizes.

Returning to FIG. 1A, chunk store 134 comprises a deduplication cleaner 166. Deduplication cleaner 166 is a "garbage collector" module that identifies storage blocks 204 (see FIG. 2B) that can be reclaimed, freed, and used to store other data. Deduplication cleaner 166 may be a background process working asynchronously relative to I/O operations directed to chunk store 134, such as asynchronously relative to I/O operations by hosts 105 or VMs 120. Deduplication cleaner 166 may be software running within hypervisor 116, memory 110, VM 120, storage 114, or within another component of system 100. Deduplication cleaner 166 may be a separate physical device connected to chunk store 134. Host 105 or system 100 may comprise one or more deduplication cleaners 166. Deduplication cleaner 166 performs method 500 of FIG. 5, and is further described below with reference to FIG. 2C and FIG. 5.

Chunk store 134 also comprises three data structures: chunk hash table 140, chunk ID table 142, and reference counts table 168. Although data structures 140, 142, and 168 are described as "tables," these data structures may be any data structure that can perform the functions of chunk hash table 140, chunk ID table 142, and reference counts table 168. Tables 140, 142, and 168 may be different data structures. Tables 140, 142, 168 may be data structures such as a log structured merge (LSM) tree, a $B^\epsilon$ tree, or a B+ tree. Chunk hash table 140 may be implemented as a file directory with each entry in chunk hash table being a file, as further described in U.S. application Ser. No. 16/552,880, incorporated by reference above.

Figure 1C:
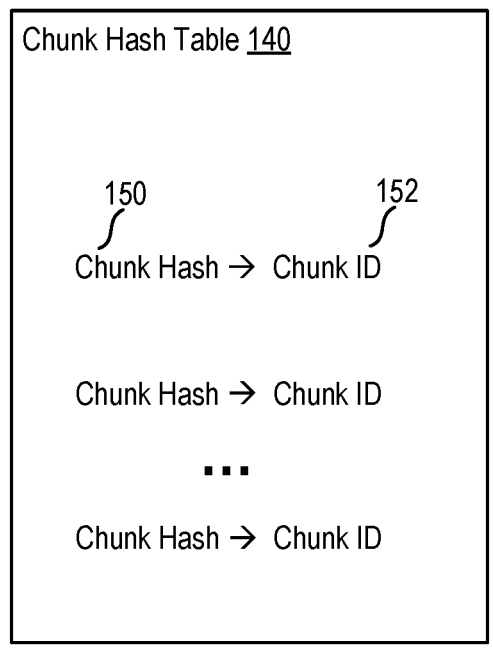
FIG. 1C depicts a block diagram of an exemplary chunk hash table and an exemplary chunk ID table, according to an embodiment.
Figure 1C:
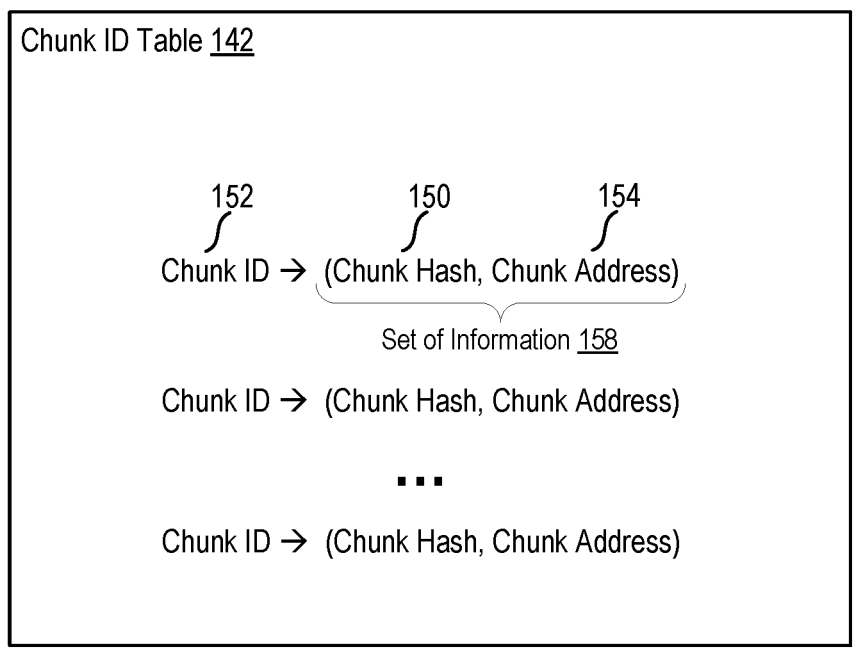

Chunk hash table 140 is shown in detail in FIG. 1C. Chunk hash table 140 is a key-value data structure that, when given a key, returns a value that is mapped to that key. The key-value mappings are mappings from the key to the value. Chunk hash table 140 includes key-value mappings, each mapping being between (a) the key, which is the hash of the contents of chunk 202 (i.e., chunk hash 150), and (b) the value, which is a chunk identifier (ID) 152. Chunk ID 152 is an arbitrarily assigned alphanumeric identifier that preserves locality and sequential order of chunks 202 of file 200. For example, chunk $202_A$ of file $200_1$ may be assigned the arbitrary chunk ID of "650." Chunk $202_B$ may then be assigned the next sequential, contiguous chunk ID, such as "651." Chunk $202_C$ may be assigned a chunk ID of "652," etc. It should be noted that "contiguous" may be defined in arbitrary increments within system 100. For example, contiguity may be defined in increments of 0.5 or 10. If contiguity is defined in increments of 0.5, then after chunk ID "650," the next contiguous chunk ID is "650.5." If contiguity is defined in increments of 10, then after chunk ID "650," the next contiguous chunk ID is "660." Chunk IDs 152 may be sourced from a reserved batch of contiguous chunk IDs 152, as discussed in U.S. application Ser. No. 16/552,880, incorporated by reference above.

Chunk ID table 142 is shown in detail in FIG. 1C. Chunk ID table 142 is a key-value data structure that, when given a key, returns a value that is mapped to that key. The key-value mappings are mappings from the key to the value. Chunk ID table 142 includes key-value mappings, each mapping being between (a) the key, which is chunk ID 152 (e.g., obtained from chunk hash table 140), and (b) the value, which is a set of information 158 about chunk 202 corresponding to that chunk ID 152. Set of information 158 may be considered "metadata" about chunk 202 corresponding to chunk ID 152 mapped to the set of information 158. Set of information 158 may include: chunk hash 150, and one or more pointers 154 to the contents of chunk 202 within chunk store 134. Pointer 154 to the contents of chunk 202 may include an address, such as a logical or physical address. Pointer 154 may be a plurality of pointers 154 pointing to locations of file 200 within storage(s) 114. Pointer 154 may be a plurality of pointers if, for example, file 200 is a fragmented file, stored in more than one location within storage(s) 114. In an embodiment, pointer 154 is a logical pointer 154 meaning it includes a logical address of a start (e.g., offset) of the corresponding chunk 202 and a length (e.g., number of bytes) of the corresponding chunk 202. Tables 140 and 142 may be regarded as containing "metadata" of the content or data of chunks 202.

Figure 1D:
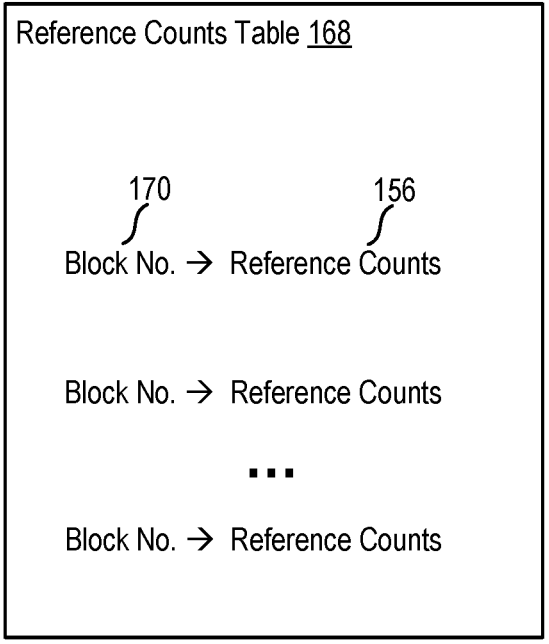
FIG. 1D depicts a block diagram of an exemplary reference counts table, according to an embodiment.

Reference counts table 168 is shown in detail in FIG. 1D. Reference counts table 168 is a key-value data structure that, when given a key, returns a value that is mapped to that key. Reference counts table 168 includes key-value mappings, each mapping being between (a) the key, which is a block number 170 of a storage block 204 (see FIG. 2B) of storage 114, and (b) the value, which is one or more reference counts 156. Reference counts 156 may include two reference counts: an internal reference count and a total reference count. The internal reference count is a count of references to the storage block 204, the reference originating from chunk ID table 142. Total reference count is a count of references to the storage block 204 that is the total of all references to storage block 204, such as for example, internal references together with external references. External references may be references from files 200. Internal and total reference counts are further described and illustrated below in the discussion of FIG. 2C.

In an embodiment, block number 170 is a physical block number 170 of corresponding storage block 204. A list or range of physical block numbers 170 may be obtained from a pointer 154 corresponding to a chunk ID 152 by, for example, converting logical pointer 154 to a physical address of a storage block 204 and to a range of storage blocks 204 spanned by chunk 202 corresponding to the chunk ID 152. The conversion may be performed by techniques known in the art. The conversion may be performed, for example, by a logical-to-physical mapping table (not shown). For example, pointer 154 may be logical byte offset mapped to the set <physical byte offset, number of bytes>. Physical byte offset can then be converted to a physical storage block 204 that indicates the initial storage block 204 of chunk 202, and number of bytes can be converted to the number of storage blocks 204 spanned by chunk 202.

Reference counts table 168 may be maintained and managed by a file system (not shown) of chunk store 134 and/or of storage(s) 114. The file system may be, for example, a vSAN Distributed File System (VDFS), made commercially available by VMware Inc. of Palo Alto, Calif. When a file 200 is first created within storage 114, the file system creates an entry or modifies an entry within reference counts table 168 for each storage block 204 spanned by the file 200. If a storage block 204 spanned by the new file 200 already contained data for an existing file 200, then an entry for that storage block 204 is modified (e.g., total reference count is incremented) to indicate that an additional file references the storage block 204. If storage block 204 did not previously contain file data, then a new entry is created within reference counts table 168 mapping block number 170 of that storage block 204 to a default internal and total reference count. The default reference count may be, for example, (0, 1) indicating that zero internal references (reference from chunk ID table 142) exist to storage block 204, and that one total reference (external reference from new file 200) exists to storage block 204. Internal reference count is modified during the file deduplication process, such as the process described in FIG. 3.

Figures 2B, 2C:
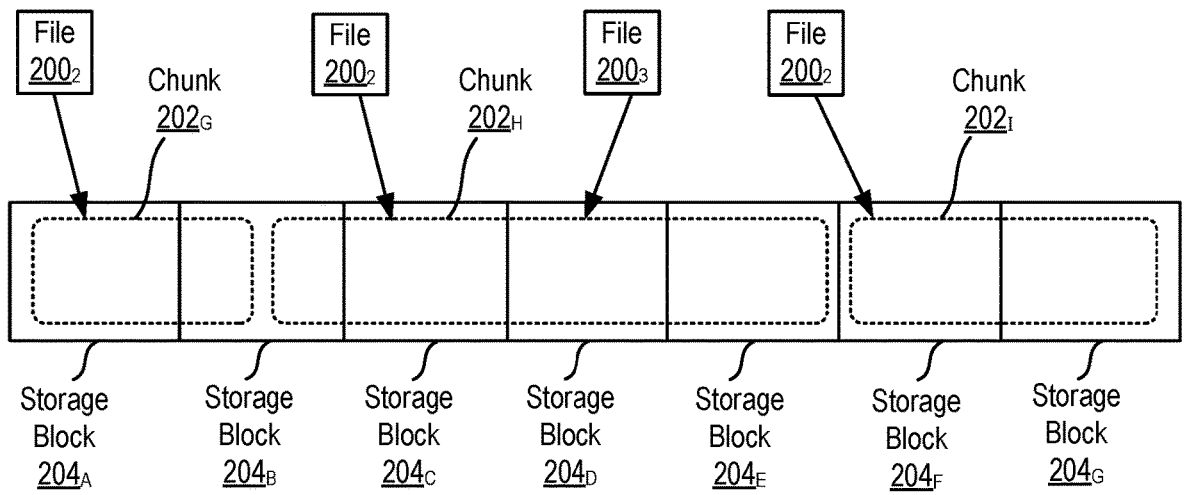
FIG. 2B depicts a block diagram of an exemplary series of contiguous storage blocks, the storage blocks containing data of chunks, according to an embodiment.
FIG. 2C depicts a block diagram of an exemplary portion of a reference counts table, according to an embodiment.

FIG. 2B depicts a block diagram of an exemplary series of contiguous storage blocks 204, according to an embodiment. Each storage block 204 has a storage block number, and this storage block number is used for mappings between storage block number 170 and reference counts 156 within reference counts table 168 (see FIG. 1D).

In FIG. 2B, the storage blocks 204 contain data of chunks 202. FIG. 2B shows, for purposes of illustration, chunks $202_G$, $202_H$, and $202_I$ of file $200_2$, which were shown in FIG. 2A. As depicted in FIG. 2B, a chunk 202 may be the only chunk within one or more storage blocks 204, such as chunk $202_I$. Or a chunk 202 may share one or more of its storage blocks 204 with another chunk 202, such as chunks $202_G$ and $202_H$. Chunks 202 that span a partial storage block 204 may share the storage block 204 with another chunk 202. In an embodiment, each chunk 202 is at least the size of a storage block 204. In this embodiment, a storage block 204 may contain data for at most two chunks 202. As used herein, for a chunk 202 to "span" storage blocks 204 means that storage blocks 204 contain data of chunk 202. In an embodiment, each storage block 204 is of identical size.

FIG. 2C depicts a block diagram of an exemplary portion 268 of reference counts table 168, according to an embodiment. FIG. 2C depicts four exemplary entries of portion of reference counts table 268, the entries corresponding to storage blocks of chunk $202_H$, which are storage blocks $204_B$, $204_C$, $204_D$, and $204_E$. That is, block number $170_B$ and reference counts $156_B$ may be regarded as metadata of storage block $204_B$, block number $170_C$ and reference counts $156_C$ may be regarded as metadata of storage block $204_C$, block number $170_D$ and reference counts $156_D$ may be regarded as metadata of storage block $204_D$, and block number $170_E$ and reference counts $156_E$ may be regarded as metadata of storage block $204_E$.

As discussed above, each reference counts 156 contains two reference count metrics: (a) the number of "internal" references to the corresponding storage block 204, and (b) the total number of references to the corresponding storage block 204. The difference between the total number of references and the internal number of references is the number of "external" references to the corresponding storage block 204. As used herein, a "reference" may be a pointer that points to a chunk 202, the chunk 202 spanning the corresponding storage block 204. As used herein, an "internal" reference is a reference from chunk ID table 142. As used herein, an "external" reference is a reference from one of files 200. In an embodiment, an "internal" reference may be a reference from any component of system 100 except from one of files 200.

The following is an example analysis of reference counts of storage block $204_B$. Reference counts $156_B$ includes an internal reference count of "2" and a total reference count of "5." The internal reference count of "2" means that two pointers 154 of chunk ID table 142 point at two chunks 202 that span storage block $204_B$. With reference to FIG. 2B, it can be seen that the two chunks 202 that span storage block $204_B$ are $chunk_G$ and chunk $204_H$. The total reference count of "5" means that three external pointers point at chunks 202 that span storage block $204_B$. An external reference count of "3" can be calculated by subtracting two internal references from five total references. The three pointers (external references) are (1) a pointer of file $200_2$ that points at chunk $202_G$, (2) a pointer of file $200_2$ that points at chunk $202_H$, and (3) a pointer of file $200_3$ that points at chunk $202_H$.

Using the two metrics of each reference count 156, a component of system 100 can determine whether any files 200 reference a storage block 204. The determination can be made by subtracting the internal reference count from the total reference count. If the difference is zero, then no files 200 reference the corresponding storage block 204. If no files 200 reference a storage block 204, then that storage block 204 may be freed or deallocated, and the content within that storage block 204 may be deleted. No files might reference a storage block 204 and/or a chunk 202 if, for example, a user deletes one or more files 200 that referenced a storage block 204 and/or a chunk 202.

In an embodiment, if a chunk 202 spans a storage block 204, then that storage block 204 may be deallocated only if all storage blocks 204 spanned by that chunk 202 also can be deallocated. This is an all-or-nothing approach of deallocating storage blocks 204 spanned by a chunk 202. One reason for the all-or-nothing embodiment or approach is that deallocating only some but not all storage blocks 204 of a chunk 202 would change the hash value of the contents of that chunk 202, resulting in a mismatch when comparing the hash value of the contents to chunk hash 150 stored in chunk ID table 142. The all-or-nothing embodiment is further discussed with reference to FIG. 5, below.

Figure 3:
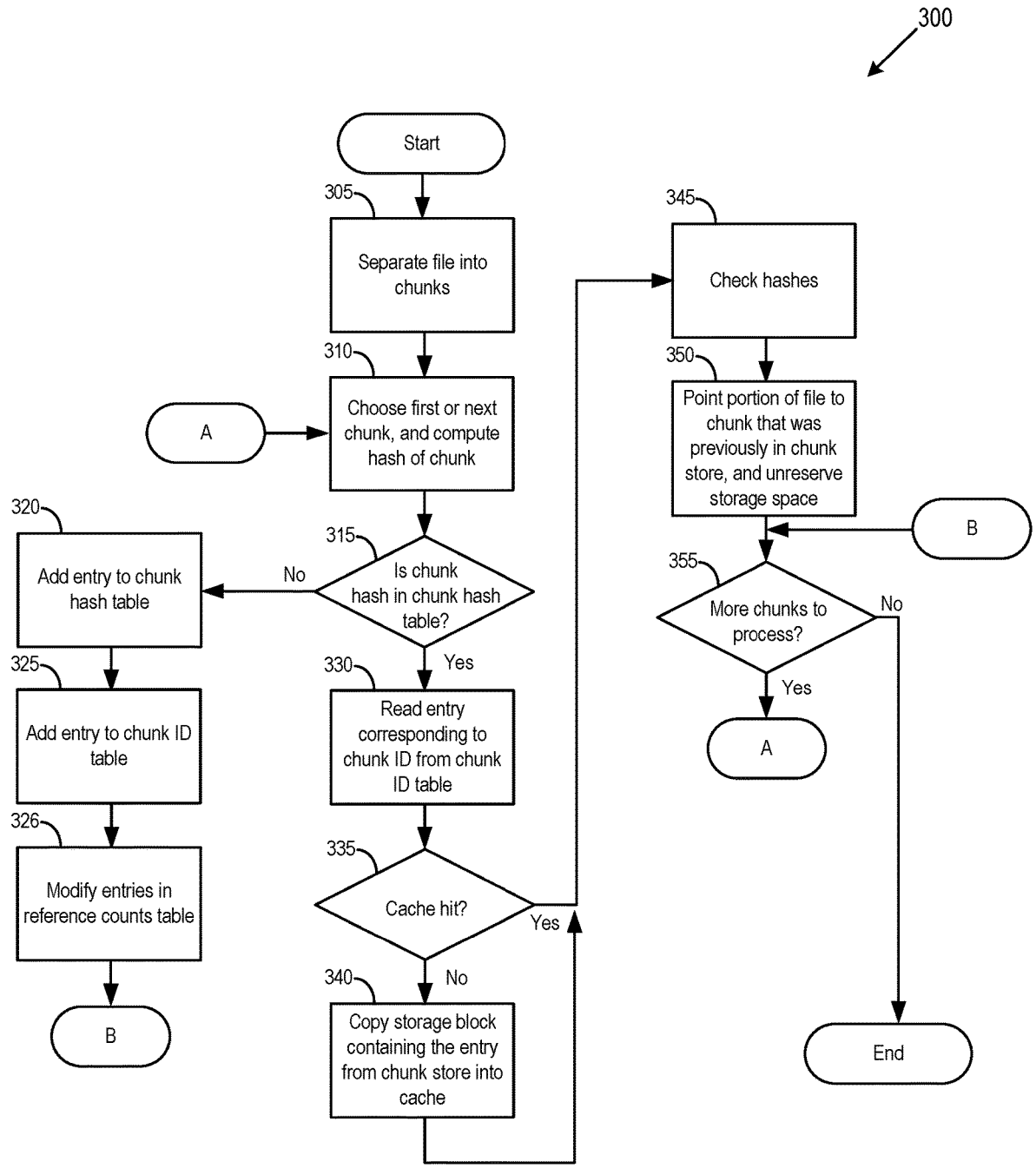
FIG. 3 depicts a flow diagram of a method of deduplicating a file, according to an embodiment.

FIG. 3 depicts a flow diagram of a method 300 of deduplicating a file 200, according to an embodiment. Method 300 may be performed by deduplication module 144. Method 300 may be performed in the background, asynchronously relative to I/O operations directed to chunk store 134. Method 300 may be triggered when deduplication module 144 identifies within chunk store 134 a new file 200 that has not been previously deduplicated. Method 300 may be triggered when deduplication module 144 identifies within chunk store 134 a file 200 that has been updated recently but has not been updated for a threshold length of time. The threshold length of time may be, for example, 24 hours. "Recently" may mean a time range that is between (a) the time that the file was last updated, and (b) the current time.

At step 305, deduplication module 144 creates boundaries within file 200 so as to divide file 200 into chunks 202. Step 305 may be performed by a process that includes Rabin fingerprinting, as described above with reference to FIG. 2A. In an embodiment, when separating a file 200 into chunks 202, a constraint may be placed on the algorithm that defines the chunks 202 so that each chunk 202 is at least the size of one storage block 204 of storage 114.

At step 310, deduplication module 144 chooses a first or next chunk 202 for processing in subsequent steps of method 300. If step 310 is reached from step 305, then method 300 has just began its first iteration, and so deduplication module 144 chooses the first chunk 202 of file 200. If step 310 is reached from step 355, then method 300 is restarting a new iteration, and so deduplication module 144 chooses the next chunk 202 of file 200.

As part of step 310, deduplication module 144 computes a hash of the data of chosen chunk 202. The hash may be computed by, for example, SHA-256 or SHA-512. In an embodiment, the computed hash may be truncated (e.g., a SHA-512 hash may be truncated to 256 bits), and the truncated hash is the hash that is "computed at step 310" for subsequent steps of method 300.

At step 315, deduplication module 144 determines whether the hash of chunk 202, computed at step 310, is in chunk hash table 140. If so, then the identical contents of chunk 202 have been previously processed by deduplication module 144, such as for example as part of a previous execution of method 300. Also if so, then a chunk identical to chunk 202 is already present within chunk store 134. If identical contents of chunk 202 have been previously processed, then an entry for hash 150 and chunk ID 152 for contents of chunk 202 already exist within chunk hash table 140, the entry having been added by a previous execution of method 300. If the hash of chunk 202 is in chunk hash table 140, then method 300 continues to step 330. Optionally, if the hash of chunk 202 is in chunk hash table 140, then as part of step 315, deduplication module 144 extracts chunk ID 152 from chunk hash table 140.

If the hash of chunk 202 is not in chunk hash table 140, then the contents of chunk 202 have not been previously deduplicated through the processing of method 300, and method 300 proceeds to step 320.

At step 320, deduplication module 144 adds an entry for chunk 202 to chunk hash table 140. As discussed above, an entry in chunk hash table 140 includes a key-value mapping between (a) the key, which is the hash of the contents of chunk 202 (i.e., chunk hash 150), and (b) the value, which is a chunk ID 152. Chunk hash 150 was computed at step 310. Chunk ID 152 is assigned to chunk 202 as described above with reference to FIG. 2A. If chunk 202 chosen at step 310 is the first chunk 202 of a file (e.g., chunk $202_A$ of file $200i$), then chunk ID 152 may be assigned arbitrarily. If chunk 202 chosen at step 310 is a second or subsequent chunk 202 (e.g., chunk $202_B$ of file $200_J$), then chunk ID may be the next sequential identifier after chunk ID 152 assigned to the previous chunk 202. Previous chunk 202 may be, for example, chunk $202_A$ of file $200_1$.

At step 325, deduplication module 144 adds an entry for chunk 202 to chunk ID table 142. As described above, an entry in chunk ID table 142 includes a key-value mapping between (a) the key, which is the chunk ID 152 assigned at step 320, and (b) the value, which is a set of information 158 about chunk 202 corresponding to that chunk ID 152.

At step 326, reference counts 156 are modified within reference counts table 168. Reference counts 156 that are modified are ones associated with blocks 204 spanned by chunk 202 that is being processed. Reference counts 156 of each of the block(s) 204 spanned by chunk 202 that is being processed are modified to increment the internal reference count by one, and therefore to also increment the total reference count by one.

As part of step 325, the storage block 204 to which an entry for chunk 202 is added is copied or fetched from one of storages 114 into cache 132. This copying of the storage block 204 into memory 110 may be an automatic part of caching and swapping operations performed by hypervisor 116, an operating system of host 105, and/or a guest operating system of VM 120. After step 325, method 300 continues to step 355.

At step 330, deduplication module 144 uses chunk ID 152 extracted from chunk hash table 140 at step 315 to send a request to obtain set of information 158 about chunk 202. The set of information 158 is requested from chunk ID table 142. Deduplication module 144 uses chunk ID 152 as a key into chunk ID table 142. The value returned (at step 330 or a subsequent step) is the set of information 158 about chunk 202. Deduplication module 144 first checks whether the set of information 158 is in cache 132 before checking storage 114 of chunk store 134.

At step 335, deduplication module 144 determines whether the set of information 158 is in cache 132. If so, then method 300 skips step 340 and continues to step 345. If not, then method 300 continues to step 340.

At step 340, the storage block 204 on which the set of information 158 is stored is copied or fetched from one of storages 114 into cache 132. As part of step 340, deduplication module 144 obtains from block cache 132 the set of information 158 associated with chunk 202. This copying of the storage block 204 into memory 110 may be an automatic part of caching and swapping operations performed by hypervisor 116, an operating system of host 105, and/or a guest operating system of VM 120.

In an embodiment, when the storage block 204 containing the set of information corresponding to a given chunk ID is copied from storage 114 to cache 132, the contents of the chunks 202 (that correspond to chunk IDs 152 in the storage block 204) are not copied into cache 132.

It should be noted that the entries in chunk ID table 142 are arranged or organized by sequential and contiguous chunk IDs 152. The entries of chunk ID table 142 may be stored sequentially and contiguously in storage 114. This means that a storage block 204 containing the set of information 158 corresponding to a given chunk ID 152 is likely to also store the sets of information 158 corresponding to a plurality of chunk IDs 152 that are before and/or after the given chunk ID 152. The sets of information 158 within the storage block 204 may be arranged contiguously with one another (in an embodiment, unseparated by other data), in an order that matches the order of associated chunk IDs 152. For example, if a storage block 204 stores the set of information corresponding to chunk ID 152 of chunk $202_B$ of file $200_1$, then that same storage block 204 is likely to also store the set of information corresponding to the chunk IDs 152 of chunks $202_A$, $202_C$, and $202_D$.

The advantage of preserving locality by organizing sets of information 158, within chunk ID table 142, by sequential and contiguous chunk IDs 152, is illustrated with respect to the following example. Assume file $200_1$ has already been deduped and file $200_2$ is in the process of being deduped by method 300. As used herein, the terms "deduped" and "deduplicated" are synonymous, and mean "having gone through a process of deduplication." Assume that at step 315, the hash of chunk $202_E$ of file $200_2$ is determined to already be within chunk hash table 140, meaning that a chunk identical to $202_E$ is already in chunk store 134. Assume that this previously deduped and identical chunk 202 is chunk $202_A$ of file $200_1$. It is likely that after chunk $202_A$, the subsequent several chunks $202_B$, $202_C$, $202_D$, etc. of file $200_1$ are the same as the several chunks following chunk $202_E$ of file $200_2$. The sets of information 158 corresponding to chunks $202_B$, $202c$, and $202_D$ are likely within the same storage block 204 as the set of information 158 of chunk $202_A$. When the storage block 204 containing set of information 158 of chunk $202_A$ is copied into cache 132 of memory 110, the sets of information 158 corresponding to chunks $202_B$, $202c$, and $202_D$ are also likely copied into cache 132. When, for example, $202_F$ of file $200_2$ is processed by method 300, the hash of the contents of chunk $202_F$ is likely to be the same as the hash of chunk $202_B$. The hash of chunk $202_B$ is already in chunk hash table 140 and chunk ID table 142 as chunk hash 150.

When the hash of chunk $202_F$ is calculated, set of information 158 corresponding to that hash is likely to already be in cache 132, precluding a need to copy a new storage block 204 into cache 132 as part of an I/O operation, as illustrated by the skipping of step 340 if a cache hit occurs in step 335 of method 300. This speeds up processing and deduplication of files 200. Organizing the sets of information, within chunk ID table 142, by sequential and contiguous chunk IDs 152, preserves locality of deduped files 200. The preserved locality results in faster read operations of sets of information 158, because the read operations are executed from memory 110 rather than from storage 114.

At step 345, deduplication module 144 checks that the hash calculated at step 310 is the same as chunk hash 150 within the obtained set of information 158. If not, then method 300 may abort and an administrator may be notified.

At step 350, a deduplication module 144 or a garbage collection module (not shown) unreserves storage space within storage 114. The unreserved storage space corresponds to the space where chunk 202 chosen at step 310 is stored. The freeing or unreserving of storage blocks may be performed as described with reference to FIG. 5, below. As part of step 350, the portion of file 200 that previously pointed to chunk 202 chosen at step 310 is remapped to point at shared chunk 202 that had already been in chunk store 134, and whose set of information 158 was retrieved at steps 330-340. As used herein, a "shared chunk" 202 is a chunk that is referenced by more than one file 200.

As part of step 350, memory pages corresponding to shared chunk 202, whose set of information 158 was retrieved at steps 330-340, are marked as copy-on-write (COW). Marking pages as COW may be performed by hypervisor 116 or an operating system of host 105 or VM 120. Step 350 may be performed before, concurrently, or after step 345.

At step 355, deduplication module 144 determines whether more chunks 202 of file 200 (of step 305) need to be processed by method 300. If so, method 300 returns to step 310. Otherwise, method 300 ends.

Figure 4:
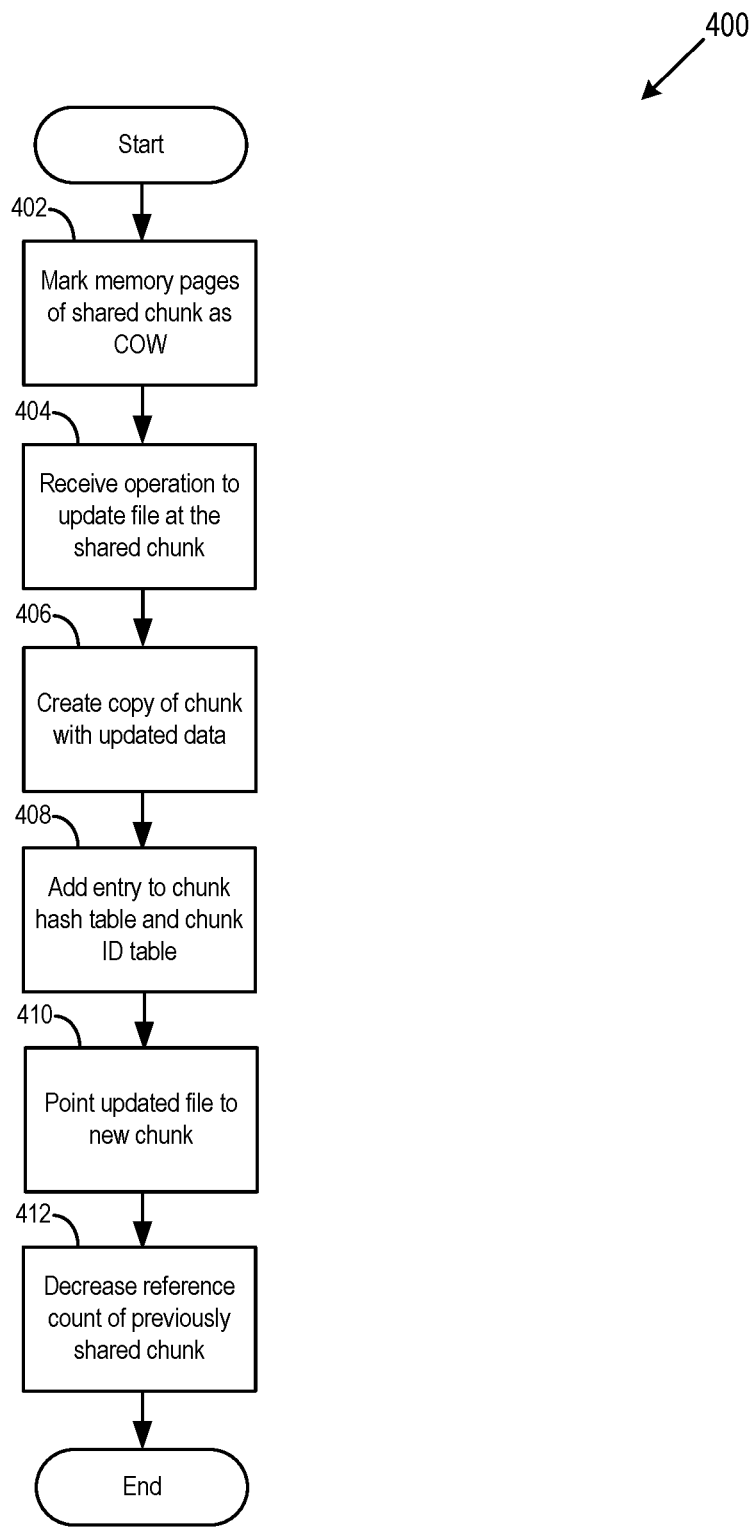
FIG. 4 depicts a flow diagram of a method of updating a file that has been previously deduped, according to an embodiment.

FIG. 4 depicts a flow diagram of a method 400 of updating a file 200 that has been previously deduped, according to an embodiment. Method 400 may be performed by deduplication module 144, hypervisor 116, an operating system of host 105 or VM 120, or a combination of these components. The file 200 that has been previously deduped may have been deduped by method 300.

At step 402, deduplication module 144 (or hypervisor 116 or an operating system of host 105 or VM 120) marks memory pages of a shared chunk 202 as COW. Step 402 may be performed as part of method 300, such as part of step 350 of method 300.

At step 404, chunk store 134 or hypervisor 116 receives an operation to update a file 200 that references the shared chunk 202, and the update operation is directed at contents of shared chunk 202.

At step 406, chunk store 134 or hypervisor 116 creates a copy of shared chunk 202, the copy being a new chunk 202 with updated data, as per the update operation of step 404.

At step 408, an entry for new chunk 202 is added to chunk hash table 140, similarly to the process of step 320 of method 300. Also as part of step 408, an entry for new chunk 202 is added to chunk ID table 142, similarly to the process of step 325 of method 300.

At step 410, the portion of updated file 200 that previously pointed to shared chunk 202 is remapped to point to new chunk 202. Because file 200 is remapped to a new chunk, shared chunk 200 may no longer be a "shared chunk" at step 410. As part of step 410 or as part of another step of method 400, the memory pages of previously shared chunk 202 may be unmarked COW.

At step 412, deduplication module 144 decreases the reference count of the shared chunk or previously shared chunk 202. Step 412 may be performed in conjunction with the file system of chunk store 134 and/or of storage(s) 114. For each storage block 204 spanned by previously shared chunk 202, the total reference count (within each reference count 156 corresponding to storage block 204 spanned by chunk 202) is decremented by one to indicate that a reference by a file 200 has been removed. However, the internal reference count (within each reference count 156 corresponding to storage block 204 spanned by chunk 202) is not modified, because the same reference(s) to chunk 202 within chunk ID table 142 continues to exist at conclusion of step 412. After step 412, method 400 ends.

Figure 5:
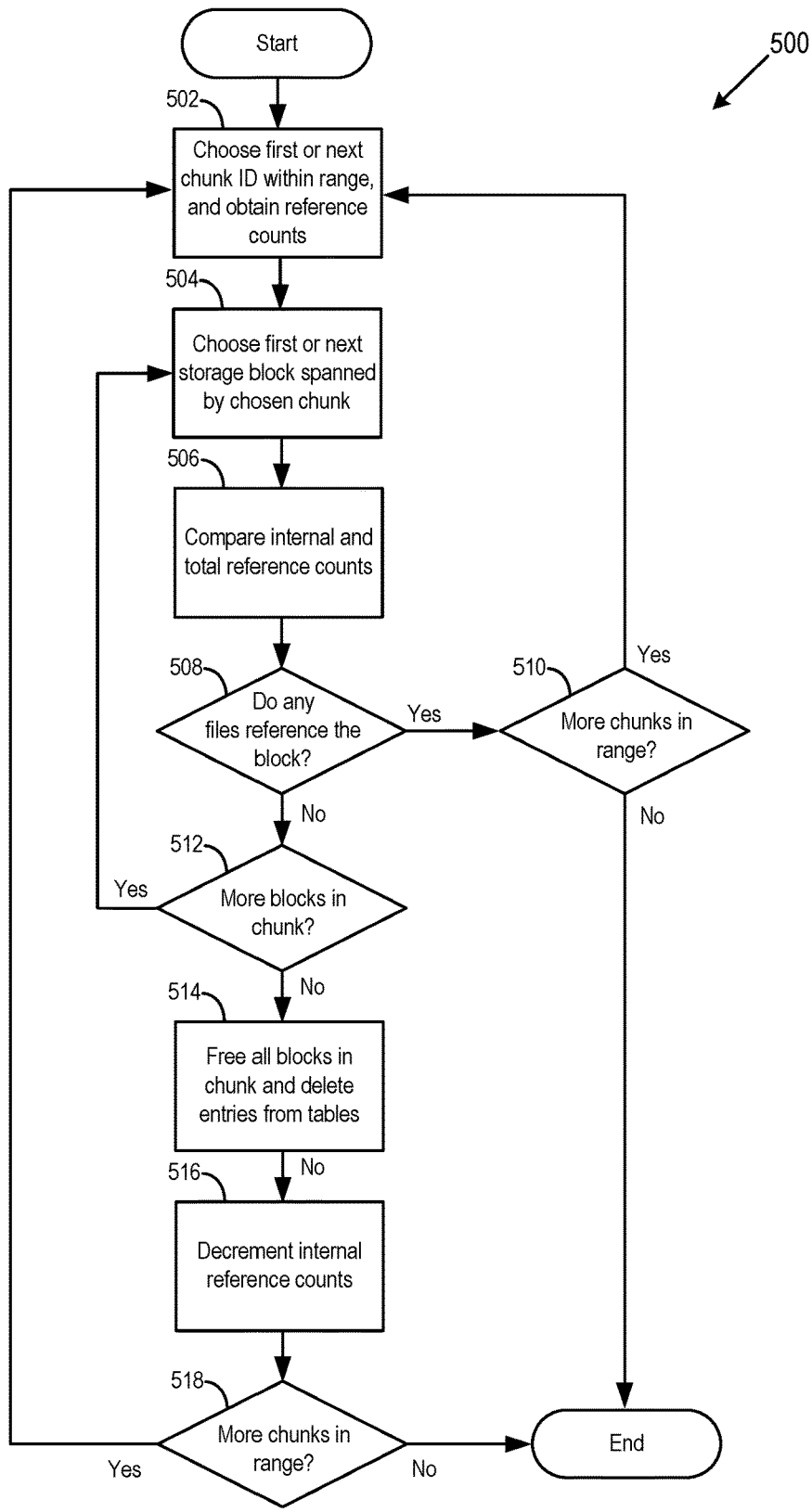
FIG. 5 depicts a flow diagram of a method of reclaiming storage blocks, according to an embodiment.

FIG. 5 depicts a flow diagram of a method 500 of reclaiming storage blocks 204, according to an embodiment. Method 500 may be performed by deduplication cleaner 166. When method 500 begins, deduplication cleaner 166 has a range of chunk IDs 152 that deduplication cleaner 166 is to analyze for storage blocks 204 that can be reclaimed. The range of chunk IDs 152 may be automatically determined by deduplication cleaner 166, such as for example based on a previous range of analyzed chunk IDs 152. Or the range of chunk IDs 152 may be determined as a result of being provided to deduplication cleaner 166, such as by an administrator or by a component of system 100. The range may be determined at least in part by accessing chunk ID table 142.

At step 502, deduplication cleaner 166 chooses the first or next chunk ID 152 within the range. If step 502 is reached from step 510 or 518, then method 300 is restarting a new iteration, and so deduplication cleaner 166 chooses the next chunk 202 within the range. Otherwise, deduplication cleaner 166 chooses the first chunk 202 within the range.

At step 504, deduplication cleaner 166 chooses a first or next storage block 204 spanned by chunk 202 associated with chunk ID 152 chosen at step 502.

At step 506, deduplication cleaner 166 accesses reference counts table 168. Deduplication cleaner 166 uses block number 170 of chosen storage block 204 to obtain reference counts 156 of the chosen storage block 204. Deduplication cleaner 166 compares the internal reference count and total reference count. The comparison may be performed by, for example, subtracting the internal reference count from the total reference count.

At step 508, deduplication cleaner 166 determines whether any files 200 reference the storage block 204 associated with the storage block 204 chosen at step 504. The determination may be performed by, for example, determining whether the difference between the internal reference count and the total reference count is zero. If the difference is zero, then no files 200 reference the storage block 204 associated with the storage block 204 chosen at step 504.

If no file 200 references the storage block 204 associated with the storage block 204 chosen at step 504, then method 500 continues to step 512. Otherwise, at least one file 200 references the storage block 204, and method 500 continues to step 510.

Steps 510 through 518 describe the "all-or-nothing" approach to freeing blocks 204 within a chunk 202, described above. However, in the embodiment in which a storage block 204 is freed if no files 200 reference that block, whether or not other blocks within the same chunk 202 are referenced by files 200, method 500 may skip step 512 and perform steps 514 and 516 only for the single storage block 204 being analyzed as step 508.

Step 510 is reached if at least one storage block 204 of chunk 202 is referenced by a file 200, and if step 510 is reached, then no storage block 204 spanned by chunk 202 is to be deallocated and freed. At step 510, deduplication cleaner 166 determines whether more chunk IDs 152 within the range remain to be analyzed by deduplication cleaner 166. If so, then method 500 continues to step 502 at which step deduplication cleaner 166 chooses the next chunk 202 to analyze. If not, then method 500 ends.

Step 512 is reached if deduplication cleaner 166 determines that chunk 202 that spans storage block 204 is not referenced by any files 200. At step 512, deduplication cleaner 166 determines whether more storage blocks 204 of chunk 202 remain to be analyzed. If so, method 500 returns to step 504, at which step deduplication cleaner 166 chooses the next storage block 204 of chunk 202 for analysis. Otherwise, method 500 continues to step 514.

At step 514, deduplication cleaner 166 deallocates or frees all storage blocks 204 spanned by chunk 202 whose chunk ID 152 was chosen at step 502. As part of step 514, an entry within chunk ID table 142 is deleted. The entry is the entry whose key is the chunk ID 152 chosen at step 502. Also as part of step 514, an entry within chunk hash table 140 is deleted. The entry is the entry whose key is the hash of the contents of chunk 202 associated with chunk ID 152 of step 502.

At step 516, deduplication cleaner 166, for each storage block 204 spanned by chunk 202, deletes the entries for that storage block 204 from reference counts table 168. In another embodiment, rather than deleting the entry for each storage block 204, deduplication cleaner 166 sets both internal and total reference counts (of reference counts 156 associated with storage block 204) to zero. Step 516 may be performed in conjunction with the file system of chunk store 134 and/or of storage(s) 114.

At step 518, deduplication cleaner 166 determines whether more chunk IDs 152 within the range remain to be analyzed by deduplication cleaner 166. If so, then method 500 continues to step 502 at which step deduplication cleaner 166 chooses the next chunk 202 to analyze. If not, then method 500 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of deallocating storage blocks of a storage system storing a plurality of files, the method comprising:
   determining a list of chunk identifiers to be analyzed for deallocation, wherein each chunk identifier is associated with a file chunk, and wherein each file chunk is at least of a size of a storage block of the storage system;
   choosing a first chunk identifier from the list, wherein the first chunk identifier identifies a first chunk;
   determining whether any storage blocks spanned by the first chunk are referenced by any file of the plurality of files by:
      determining an internal reference count of the storage block, wherein the internal reference count is a number of references to the storage block by a chunk ID data structure,
      determining a total reference count of the storage block, and
      subtracting the internal reference count from the total reference count;
   determining that no file of the plurality of files references the storage blocks spanned by the first chunk; and
   deallocating all storage blocks spanned by the first chunk.

2. The method of claim 1, wherein the determining the internal reference count comprises accessing a reference count data structure by using a block number of the storage block as a key.

3. The method of claim 1, the method further comprising:
   if the result of the subtracting is zero, determining that no file points to the storage block; and
   if the result of the subtracting is not zero, determining that a file points to the storage block.

4. The method of claim 1, wherein the chunk ID data structure comprises key-value mappings between keys and values, the keys being chunk identifiers of corresponding chunks, and the values being sets of information about the corresponding chunks.

5. The method of claim 4, wherein the determining the list of chunk identifiers to be analyzed for deallocation is performed at least in part by accessing the chunk ID data structure.

6. The method of claim 4, wherein a set of information corresponding to the first chunk comprises at least one of: (a) a hash of a content of the first chunk, or (b) a pointer to the content of the first chunk.

7. The method of claim 1, the method further comprising, prior to the determining the list of chunk identifiers to be analyzed for deallocation, separating each file of the plurality of files into chunks, each chunk being at least the size of the storage block of the storage system.

8. The method of claim 1, the method further comprising, prior to the determining the list of chunk identifiers to be analyzed for deallocation, deduplicating a file comprising the first chunk.

9. A non-transitory computer readable medium comprising instructions to be executed in a processor of a computer system, the instructions when executed in the processor cause the computer system to carry out a method of deallocating storage blocks of a storage system storing a plurality of files, the method comprising:
  determining a list of chunk identifiers to be analyzed for deallocation, wherein each chunk identifier is associated with a file chunk, and wherein each file chunk is at least of a size of a storage block of the storage system;
  choosing a first chunk identifier from the list, wherein the first chunk identifier identifies a first chunk;
  determining whether any storage blocks spanned by the first chunk are referenced by any file of the plurality of files by:
    determining an internal reference count of the storage block, wherein the internal reference count is a number of references to the storage block by a chunk ID data structure,
    determining a total reference count of the storage block, and
    subtracting the internal reference count from the total reference count;
  determining that no file of the plurality of files references the storage blocks spanned by the first chunk; and
  deallocating all storage blocks spanned by the first chunk.

10. The non-transitory computer readable medium of claim 9, wherein the determining the internal reference count comprises accessing a reference count data structure by using a block number of the storage block as a key.

11. The non-transitory computer readable medium of claim 9, the method further comprising:
  if the result of the subtracting is zero, determining that no file points to the storage block; and
  if the result of the subtracting is not zero, determining that a file points to the storage block.

12. The non-transitory computer readable medium of claim 9, wherein the chunk ID data structure comprises key-value mappings between keys and values, the keys being chunk identifiers of corresponding chunks, and the values being sets of information about the corresponding chunks.

13. The non-transitory computer readable medium of claim 12, wherein the determining the list of chunk identifiers to be analyzed for deallocation is performed at least in part by accessing the chunk ID data structure.

14. The non-transitory computer readable medium of claim 12, wherein a set of information corresponding to the first chunk comprises at least one of: (a) a hash of a content of the first chunk, or (b) a pointer to the content of the first chunk.

15. The non-transitory computer readable medium of claim 9, the method further comprising, prior to the determining the list of chunk identifiers to be analyzed for deallocation, separating each file of the plurality of files into chunks, each chunk being at least the size of the storage block of the storage system.

16. The non-transitory computer readable medium of claim 9, the method further comprising, prior to the determining the list of chunk identifiers to be analyzed for deallocation, deduplicating a file comprising the first chunk.

17. A computer system comprising:
  a storage system; and
  at least one processor, wherein the at least one processor is programmed to carry out a method of deallocating storage blocks of the storage system storing a plurality of files, the method comprising:
    determining a list of chunk identifiers to be analyzed for deallocation, wherein each chunk identifier is associated with a file chunk, and wherein each file chunk is at least of a size of a storage block of the storage system;
    choosing a first chunk identifier from the list, wherein the first chunk identifier identifies a first chunk;
    determining whether any storage blocks spanned by the first chunk are referenced by any file of the plurality of files by:
      determining an internal reference count of the storage block, wherein the internal reference count is a number of references to the storage block by a chunk ID data structure,
      determining a total reference count of the storage block, and
      subtracting the internal reference count from the total reference count;
    determining that no file of the plurality of files references the storage blocks spanned by the first chunk; and
    deallocating all storage blocks spanned by the first chunk.

18. The computer system of claim 17, wherein the determining the internal reference count comprises accessing a reference count data structure by using a block number of the storage block as a key.

19. The computer system of claim 17, the method further comprising:
  if the result of the subtracting is zero, determining that no file points to the storage block; and
  if the result of the subtracting is not zero, determining that a file points to the storage block.

20. The computer system of claim 17, wherein the chunk ID data structure comprises key-value mappings between keys and values, the keys being chunk identifiers of corresponding chunks, and the values being sets of information about the corresponding chunks.

* * * * *